United States Patent [19]
Marzocchi

[11] 3,953,648
[45] *Apr. 27, 1976

[54] GLASS FIBER REINFORCED ELASTOMERS

[75] Inventor: Alfred Marzocchi, Cumberland, R.I.

[73] Assignee: Owens-Corning Fiberglas Corporation, Toledo, Ohio

[ * ] Notice: The portion of the term of this patent subsequent to Mar. 4, 1992, has been disclaimed.

[22] Filed: Aug. 22, 1974

[21] Appl. No.: 499,755

Related U.S. Application Data

[60] Division of Ser. No. 244,589, April 17, 1972, Pat. No. 3,869,306, which is a continuation of Ser. No. 398,305, Sept. 22, 1964, abandoned.

[52] U.S. Cl. ............................ 428/378; 57/140 G; 57/153; 260/3; 260/37 R; 260/42.15; 428/292; 428/295; 428/391; 428/392
[51] Int. Cl.² .................... B32B 17/02; B32B 17/04
[58] Field of Search ............... 117/126 GS, 126 GB, 117/126 GN, 72; 428/292, 295, 378, 391, 392; 260/3, 37 R, 42.15; 57/140 G, 153

[56] References Cited
UNITED STATES PATENTS

| | | | |
|---|---|---|---|
| 2,314,998 | 3/1943 | Lessig et al. | 156/335 |
| 2,763,573 | 9/1956 | Biefeld | 117/72 |
| 3,168,389 | 2/1965 | Eilerman | 117/126 GS |
| 3,194,294 | 7/1965 | VanGils | 156/335 |
| 3,231,540 | 1/1966 | Vanderbilt | 117/126 GB |
| 3,252,278 | 5/1966 | Marzocchi | 117/72 |
| 3,330,689 | 7/1967 | Ells | 117/126 GB |
| 3,869,306 | 3/1975 | Marzocchi | 117/72 |

Primary Examiner—Ralph Husack
Assistant Examiner—William H. Schmidt
Attorney, Agent, or Firm—John W. Overman; Keith V. Rockey

[57] ABSTRACT

The improvement in the bonding relationship between glass fibers and elastomeric materials in the manufacture of glass fiber reinforced elastomeric products wherein the glass fibers are previously sized with a size consisting essentially of an anchoring agent such as an amino silane, an epoxy silane or a Werner complex compound wherein the carboxylato group of the Werner complex contains either an amino group or an epoxy group and impregnated in bundle form with an impregnant consisting essentially of a natural rubber and resorcinol-formaldehyde resin and in which the impregnating composition may be employed as the size to provide the desired loading of material on the glass fiber surfaces without subsequent impregnation of the fiber bundle when the size composition is formulated of the natural rubber latex - resorcinol-formaldehyde resin plus an organo silicon compound or Werner complex compound wherein the organo silicon compound is formed of an amino silane or epoxy silane and wherein the carboxylato group of the Werner complex compound contains either an amino group or an epoxy group.

3 Claims, 4 Drawing Figures

GLASS FIBER REINFORCED ELASTOMERS

This is a division of my copending application Ser. No. 244,589, filed on Apr. 17, 1972, now U.S. Pat. No. 3,869,306, which in turn is a continuation of my earlier application Ser. No. 398,305, filed on Sept. 22, 1964, now abandoned.

This invention relates to elastomeric products reinforced or otherwise combined with glass fibers and it relates more particularly to the method and compositions employed in the treatment of the glass fibers to enhance the bonding relationship between the glass fibers and the elastomeric materials for making fuller utilization of the desirable characteristics of the glass fibers in their combination with the elastomeric materials.

The term "glass fibers", as used herein, shall refer to (1) continuous fibers formed by the rapid attenuation of hundreds of streams of molten glass and to strands formed when such continuous glass fiber filaments are gathered together in forming; and to yarns and cords formed by plying and/or twisting a number of strands together, and to woven and non-woven fabrics which are formed of such glass fiber strands, yarns or cords, and (2) discontinuous fibers formed by high pressure steam or air directed angularly downwardly onto multiple streams of molten glass issuing from the bottom side of a glass melting bushing and to yarns that are formed when such discontinuous fibers are allowed to rain down gravitationally onto a foraminous surface wherein the fibers are gathered together to form a sliver which is drafted into a yarn; and to woven and non-woven fabrics formed of such yarns of discontinuous fibers, and (3) combinations of such continuous and discontinuous fibers in strand, yarn cord and fabrics formed thereof.

As used herein, the term "elastomer" is meant to include natural rubber in the cured or uncured stage, vulcanized or unvulcanized stage, and synthetic organic elastomeric materials such as butadiene-styrene copolymer, butadiene-acrylonitrile copolymer, chloroprene, isoprene, neoprene, isobutyl rubber and the like elastomeric polymers and copolymers in their cured or uncured stages, and vulcanized or unvulcanized stages.

The invention is addressed to the fuller utilization of the desirable characteristics of glass fibers, such as their high strength, flexibility, thermal stability, chemical stability, inertness, electrical resistance and heat conductive characteristics when used in combination with elastomeric materials as a reinforcement or as a stabilizing agent in belt manufacture, as reinforcing cords and fabrics to increase strength, life, wearability and service characteristics in rubber tires, and as a reinforcement and the like in other elastomeric coated fabrics and molded elastomeric products.

It is an object of this invention to provide a new and improved composition which may be used as a forming size for treatment of glass fibers in forming or preferably as an impregnating composition for treatment, in forming or afterwards, of bundles, yarns, cords, strands and fabrics formed of glass fibers to enable fuller utilization to be made of the desirable characteristics of the glass fibers when used in combination with elastomeric materials in the manufacture of glass fiber reinforced molded products and coated fabrics.

More specifically, it is an object of this invention to provide a composition for use in the treatment of glass fibers in forming to improve the processing and the performance characteristics of the glass fibers as a reinforcement for elastomeric materials and for use in the treatment of bundles, strands, yarns, cords and fabrics of glass fibers, in forming or afterwards, to enhance their bonding relationship when used in combination with elastomeric materials in the manufacture of glass fiber reinforced plastics, laminates or coated fabrics and it is a related object to provide a method and means for making fuller utilization of the strength properties of glass fibers when used as a reinforcement for elastomeric materials.

These and other objects and advantages of this invention will hereinafter appear and, for purposes of illustration, but not of limitation, an embodiment of the invention is shown in the accompanying drawing, in which FIG. 1 is a flow diagram showing the manufacture of continuous glass fibers and the treatment thereof in forming to improve the processing characteristics of the glass fibers and to improve the performance characteristics of the glass fibers when used in combination with elastomeric materials in the manufacture of glass fiber reinforced elastomeric products;

To the present, glass fibers which have been added or otherwise incorporated with elastomeric materials, in the form of continuous or chopped fibers, have functioned more or less as a filler than as a reinforcement, or flexibilizing agent, or stabilizing agent. As a result, little, if any, improvements in mechanical and physical properties have been made available from the combinations which made use of glass fibers in products formed of elastomeric materials. It is believed that the failure to make fuller utilization of some of the more desirable properties of the glass fiber components resides in the inability properly to integrate the glass fibers with the elastomeric system.

Investigations have been conducted over the past several years by the most highly skilled in the art in the attempt to make fuller utilization of the glass fiber components formulated into elastomeric materials in the endeavor to fabricate products having new and improved physical and mechanical properties. Substantial inroads are now being made as represented by the practice of this invention, as will hereinafter be described.

The invention will be described with reference to a new and improved composition which can be employed as an original size applied to the glass fibers in forming thereby individually to coat each of the glass fiber filaments subsequently formed into the strand, yarn, cord or fabric to provide both the desired processing and performance characteristics for processing the sized glass fibers in the formation of the strand and in the twisting and plying of the strands into yarns or cords and in the processing of the strands, yarns or cords into fabrics and the desired performance characteristics for enhancing the bonded relationship when the sized glass fibers are combined with elastomeric materials in the manufacture of reinforced elastomeric products.

In the preferred practice of this invention, the composition if formulated as an impregnating composition for treatment of strands, yarns, cords and fabrics formed of previously sized glass fibers for penetration of the treating composition into the strand, yarn, cord or fabric with the intention of individually coating the fibers to protect the fibers against destruction by mutual abrasion while establishing a bonded relationship therewith or else penetrating the glass fiber strand, yarn, cord or fabric sufficiently to intertie the glass fiber system with the elastomeric materials with which the glass fibers are combined in the manufacture of glass fiber - elastomeric products.

Figure 1:
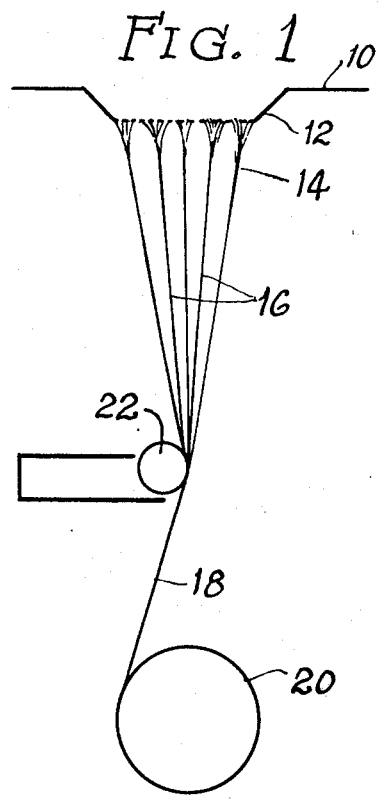
Figure 3:
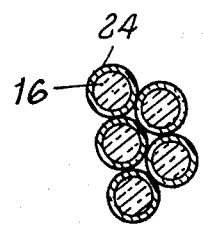
FIG. 3 is a cross-sectional view of glass fibers processed in accordance with the diagram illustrated in FIG. 1.
Figure 4:
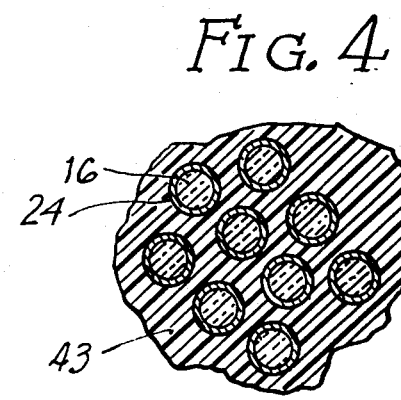
FIG. 4 is a cross-sectional view of a bundle of glass fibers processed in accordance with the flow diagram of FIG. 2.

Referring now to the schematic diagram of FIG. 1, the glass is melted in a glass melting furnace 10 having a bushing 12 on the bottom side. The bushing is formed with a plurality of openings extending therethrough and the molten glass flows gravitationally through the hundreds of small openings in the bushing to form therein streams 14 which are rapidly attenuated into fine glass filaments 16 by winding the filaments about a rapidly rotating drum 20. The filaments 16 are sized with one of the size compositions of Examples 1 to 3 as they are gathered together to form a strand. For this purpose, use is made of an applicator 22 which is illustrated as a wiping pad that is constantly wet with the forming size composition. The filaments of glass are each wet with the size composition as they are gathered together to form the strand 18 that is wound about the drum 20.

The sized strands are allowed to air dry or drying of the thin size coating can be accelerated by exposure to elevated temperatures such as a temperature within the range of 150°F to 250°F. The applied size forms a very thin coating 24 on the surface of the glass fibers 16 to impart a desired balance of lubricity and bonding without destroying the fibrous characteristic or appearance of the fiber.

The strand 18 of sized glass fibers is preferably plied with other strands and twisted to form yarns, threads, or cords which may be used as a reinforcement for elastomeric materials, with or without cutting to shorter lengths, and which can be formed into woven or non-woven fabrics for subsequent combination with elastomeric materials.

The following examples will serve to illustrate the principal concepts of this invention in a composition and method for the treatment, as by impregnation, of bundles, yarns, cords and fabrics of glass fibers wherein the fibers have previously been sized in forming with a conventional size composition which has preferably been modified to embody a glass fiber anchoring agent.

EXAMPLE 1
Forming Size Composition

| | Percent by weight |
|---|---|
| Partially dextrinized starch | 8.0 |
| Hydrogenated vegetable oil | 1.8 |
| Cationic wetting agent (lauryl amine acetate) | 0.4 |
| Nonionic emulsifying agent | 0.2 |
| Gamma-aminopropyltriethoxy silane | 1.0 |
| Water | 88.6 |

EXAMPLE 2
Forming Size Composition

| | Percent by weight |
|---|---|
| Saturated polyester resin | 3.2 |
| Fatty acid amine wetting agent (Nopcogen 16L) | 0.1 |
| Polyvinyl alcohol | 0.1 |
| Pyrrolidine | 3.0 |
| Gamma-aminopropyltriethoxy silane | 0.3 |
| Glacial acetic acid | 0.1 |
| Water | 93.2 |

EXAMPLE 3
Forming Size Composition

| | Percent by weight |
|---|---|
| Paraffin wax in aqueous emulsion | 0.2 |
| Cationic amide polyester resin | 1.3 |
| Polyglycol condensate (300 to 400 m.w.) | 2.3 |
| Gelatin | 0.25 |
| Gamma-aminopropyltriethoxy silane | 0.5 |
| Dibasic ammonium phosphate | 0.1 |
| Glacial acetic acid | 0.2 |
| Water | 95.15 |

After the fibers have been processed into strands, yarns, cords or fabrics, hereinafter referred to generally as bundles, the bundles of sized glass fibers are impregnated with a composition embodying the features of this invention having the general formula of the following examples:

EXAMPLE 4
Impregnating Composition

| | Percent by weight |
|---|---|
| Natural rubber latex - resorcinol-formaldehyde resin dispersed in aqueous medium to a solids content of 38% by weight (Lotol - U.S. Rubber Company, Naugatuck Chemical Division) | 40–80 |
| Water | 60–20 |

EXAMPLE 5
Impregnating Composition

| | Percent by weight |
|---|---|
| Natural rubber latex - resorcinol-formaldehyde resin dispersed in aqueous medium to 38% by weight solids (Lotol - U.S. Rubber Company) | 60 |
| Water | 40 |

Figure 2:
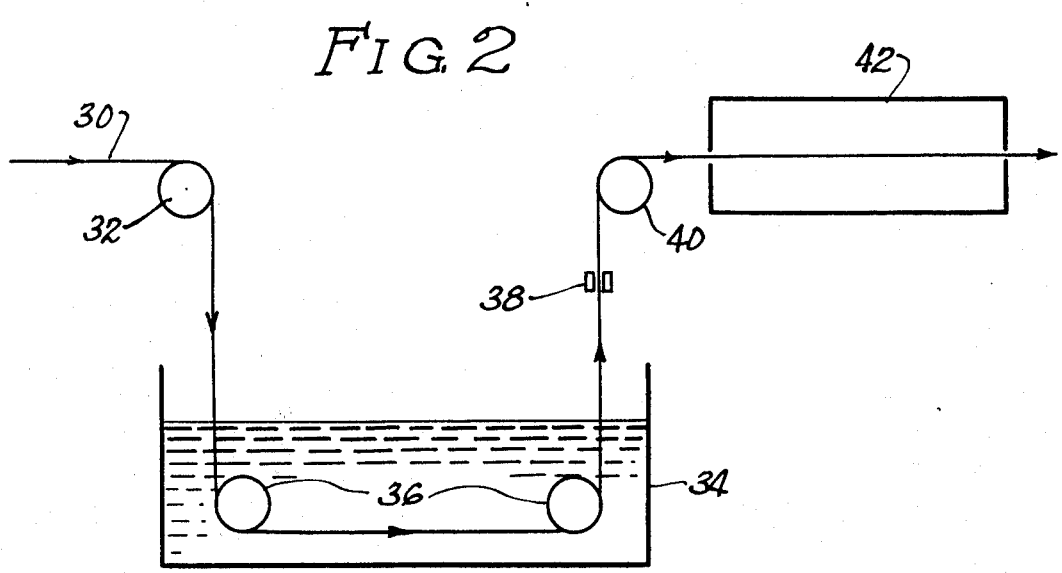
FIG. 2 is a flow diagram illustrating the treatment of glass fibers subsequent to their being formed into bundles, strands, yarns, cords or fabrics to impregnate the glass fiber bundles in accordance with the preferred practice of this invention.

Impregnation with the aqueous composition of Examples 4 and 5 is preferably made via a solvent bushing, but it can also be achieved by other conventional impregnation means such as by immersion of the glass fiber bundle in a bath of the aqueous impregnating composition. Referring more specifically to FIG. 2 of the drawing, the glass fiber bundle 30 is advanced over the guide roller 32 for passage downwardly into the bath 34 of the impregnating composition. It is then turned about the roller 36 to effect a sharp bend which operates to open the bundle for fuller penetration of the liquid impregnating composition into the bundle of sized fibers. The impregnated bundle is then raised from the bath for passage through the die 38 which wipes excess impregnating composition from the bundle before the endless bundle is advanced over the roller 40 into an air drying oven 42 maintained at a temperature preferably above ambient temperature and more preferably at a temperature within the range of 150° to 350°F to accelerate removal of the aqueous diluent and to set the solids of the impregnating composition. Drying will occur in a relatively short period of time ranging from 1 to 30 minutes, depending somewhat upon the temperature of the oven.

It is desirable to achieve as full impregnation as possible into the bundle in order more effectively to separate the fibers one from the other by the impregnating solids since the natural rubber - resorcinol-formaldehyde resin becomes effective as a coating 43 on the sized glass fibers to cushion the fibers and to militate against destruction of the fibers by mutual abrasion. Thus, the deeper the penetration of the impregnating composition into the bundle, the more effective will be the bond or tie-in between the glass fibers in the bundle and the elastomeric material with which the bundles of glass fibers are combined in the manufacture of glass fiber - elastomeric products. In the final product the elastomeric material will form the continuous phase. Such continuous phase of elastomeric material can be the same natural rubber as is employed in the impregnating composition, or it can differ therefrom. It can be in the cured or uncured or vulcanized or unvulcanized stage. The tie-in between the impregnated bundles of glass fibers and the elastomeric material forming the continuous phase will take place primarily during the cure or vulcanization of the elastomeric material in the fabrication of the elastomeric product.

More complete protection for the individual glass fibers and full tie-in with the continuous phase of the elastomeric material can be achieved when the impregnating compositions of Examples 4 and 5 are adapted for treatment of the glass fibers as a size composition which can be applied to the individual glass fibers as they are formed, as illustrated in FIG. 1 of the drawing. For this purpose, the impregnating compositions of Examples 4 and 5 should be formulated to include an anchoring agent such as gamma-aminopropyltriethoxy silane. Instead of the gamma-aminopropyltriethoxy silane in the size or in the impregnating composition, use can be made of other organo silicon compounds in which the organic group attached to the silicon atom contains an amino group or epoxy group, such as gamma aminopropylvinyldiethoxy silane, gamma-(triethoxysilylpropylamide)propylamine, N-(gamma-triethoxysilylpropyl)propylamine, beta-aminoallyltriethoxy silane, para-aminophenyltriethoxy silane, or of a Werner complex compound in which the carboxylato group coordinated with the trivalent nuclear chromium atom contains an amino group or epoxy group, such as in aminopropylato chromic chloride, glycine chromic complex, beta-alanine chromic complex, and the like.

A forming size embodying the further concepts of this invention can be formulated as follows:

EXAMPLE 6
Forming Size Composition

| | Parts by weight |
|---|---|
| Natural rubber latex - resorcinol-formaldehyde resin dispersed in an aqueous medium to a solids content of 38% (Lotol 4150) | 10-40 |
| Gamma-aminopropyltriethoxy silane (anchoring agent) | 0.1-5.0 |
| Water | 89.9-55 |

EXAMPLE 7
Forming Size Composition

| | Parts by weight |
|---|---|
| Natural rubber latex - resorcinol-formaldehyde resin dispersed in aqueous medium to 38% solids | 15 |
| Gamma-aminopropyltriethoxy silane | 3 |
| Water | 82 |

The size compositions of Examples 6 and 7 can be applied to the glass fiber surfaces in forming by the procedure illustrated in FIG. 1 of the drawing and as described with reference to the forming size of Examples 1 to 3.

In the size compositions of Examples 6 and 7, the anchoring agent can be replaced by other amino silanes or epoxy silanes or by Werner complex compounds containing an epoxy or amino group in the carboxylato group coordinated with the trivalent nuclear chromium atom and such anchoring agents may be employed in the size composition in an amount within the range of 0.1 to 3.0 percent by weight and preferably 0.15 to 1 percent by weight, or in the ratio of 0.1 to 5 parts by weight anchoring agent to 100 parts by weight of solids.

When use is made of a forming size wherein the formed glass fiber bundles are subsequently to be impregnated for loading with an elastomeric impregnating composition, as represented by Examples 4 and 5, the forming size is formulated to have a solids content within the range of 0.25 to 3.0 percent by weight and preferably 0.5 to 1.0 percent by weight with the intent of incorporating a dry coating weight in the range of 0.5 to 1.0 percent by weight on the sized glass fibers. When use is made of a forming size intended also for use in loading the fibers with an elastomeric component, as represented by Examples 6 and 7, the solids content should be considerably higher such as within the range of 10 to 50 percent by weight for application of dry coating weights within the range of 20 to 45 percent by weight based upon the coated glass fibers. When use is made of an impregnating composition, as in Examples 4 and 5, for impregnation of fibrous bundles in which the fibers have previously been sized in forming, as in Examples 1 to 3, it is desirable to make use of a composition containing 10 to 50 percent by weight solids and to provide for a dry weight of 5 to 25 percent by weight and preferably 10 to 15 percent by weight solids based upon the impregnated fibrous structure.

When the glass fibers are sized in forming with a composition of the type illustrated in Examples 6 and 7, the sized fibers can be processed directly into strands, yarns, cords and fabrics for use in combination with elastomeric materials without the need for impregnation of the bundles since the individual fibers in the bundle are already provided with the coating 24 having the desired components for anchoring the elastomeric material and for protecting the glass fibers.

In the combination with elastomeric materials, the glass fibers or bundles of glass fibers, which are processed in accordance with the practice of this invention, are admixed with the elastomeric material or otherwise laid down in the desired arrangement for combination with the elastomeric material and subsequently conventionally processed by molding or cure under heat and compression or by vulcanization to advance the elastomeric phase to a cured or vulcanized stage in the combination with the treated glass fibers whereby the coating or the impregnant provided on the glass fiber surfaces or on the bundles of glass fibers, in accordance with the practice of this invention, operate to integrate the continuous phase of the elastomeric material to tie in the glass fibers with the continuous phase. Thus the glass fibers become integrated to form a part of the elastomeric product.

It will be understood that the size compositions, represented by Examples 6 and 7, may also be employed as impregnating compositions since the anchoring agent embodied therein will operate further to facilitate the bonding relationship or integration between the continuous phase of elastomeric material and the coated glass fibers.

It will be apparent that I have provided a new and improved composition for use in the treatment of glass fibers and bundles formed thereof to enhance the integration between the glass fibers and the elastomeric material in the manufacture of glass fiber - elastomeric products.

It will be understood that invention exists not only in the composition and in the process in the use of the composition in the treatment of glass fibers, but invention exists also in the treated or impregnated glass fiber product which is formed thereof and which finds enhanced utility in combinations with elastomeric materials.

It will be further understood that changes may be made in the details of formulation and method of application or use without departing from the spirit of the invention, especially as defined in the following claims.

I claim:

1. A glass fiber bundle formed of a plurality of glass fibers, each of the glass fibers having a thin size coating on the individual surfaces thereof consisting essentially of an anchoring agent in the form of an organo silicon compound having an organic group attached directly to the silicon atom which contains an amino group and an impregnant in the bundle to separate the glass fibers each from the other, said impregnant consisting essentially of a combination of a resorcinol-formaldehyde resin and a rubber.

2. A glass fiber bundle as defined in claim 1 wherein the thin size coating is present in a coating weight of 0.5 to 1% by weight.

3. A glass fiber bundle as defined in claim 1 wherein the anchoring agent is gamma-aminopropyltriethoxy silane.

* * * * *